United States Patent
Yang

(10) Patent No.: US 6,742,681 B1
(45) Date of Patent: Jun. 1, 2004

(54) STRUCTURE OF A WATER OUTLET VALVE FOR WATER BAG MOUTHPIECES

(76) Inventor: Shih-Sheng Yang, PO Box 82-144, Taipei (TW)

( * ) Notice: Subject to any disclaimer, the term of this patent is extended or adjusted under 35 U.S.C. 154(b) by 0 days.

(21) Appl. No.: 10/397,801

(22) Filed: Mar. 27, 2003

(51) Int. Cl.$^7$ .............................................. F16K 3/316
(52) U.S. Cl. ...................... 222/509; 222/175; 222/490; 220/703; 220/714; 220/715; 251/344
(58) Field of Search ................. 222/175, 509, 222/518, 525, 545, 490; 251/344; 220/703, 705, 714, 715; 224/148.2, 414

(56) References Cited

U.S. PATENT DOCUMENTS

| | | | | |
|---|---|---|---|---|
| 3,738,545 A | * | 6/1973 | Roy | 222/525 |
| 4,055,179 A | * | 10/1977 | Manschot et al. | 251/344 |
| 5,595,325 A | * | 1/1997 | Leres | 222/175 |
| 5,699,933 A | * | 12/1997 | Ho et al. | 220/715 |
| 5,911,406 A | * | 6/1999 | Winefordner et al. | 222/175 |
| 5,924,678 A | * | 7/1999 | Olde | 251/348 |
| 6,062,435 A | * | 5/2000 | Hess, III | 222/175 |
| 6,085,947 A | * | 7/2000 | Lien | 222/525 |
| 6,273,128 B1 | * | 8/2001 | Paczonay | 220/703 |
| 6,279,772 B1 | * | 8/2001 | Bowman | 220/703 |
| 6,497,348 B2 | * | 12/2002 | Forsman et al. | 222/531 |
| 6,557,721 B2 | * | 5/2003 | Yang | 220/714 |
| 6,622,988 B2 | * | 9/2003 | Gill | 222/175 |

* cited by examiner

Primary Examiner—Kenneth Bomberg
(74) Attorney, Agent, or Firm—Leong C. Lei

(57) ABSTRACT

A water outlet valve structure for a water bag mouthpiece, which includes a mouthpiece, a threaded base disposed on one end of said mouthpiece, a blocking member disposed at one end of said threaded base, and a sleeve base disposed at one end of said blocking member; wherein said blocking member having a push bottom on one side, such that the sleeve base can displace when operating the push bottom from the outside in order to control the water releasing and water stopping functions. By means of the above structure, the user can easily use the mouthpiece to drink water from the water bag, and the mouthpiece can be fixed onto the water outlet valve more securely.

1 Claim, 8 Drawing Sheets

STRUCTURE OF A WATER OUTLET VALVE FOR WATER BAG MOUTHPIECES

BACKGROUND OF THE INVENTION

1. Field of the Invention

The present invention relates to a water outlet valve of a water bag mouthpiece, more particularly to a water outlet valve of a water bag mouthpiece with water releasing and water stopping functions and also can be secured onto the water bag.

2. Description of the Related Art

A prior-art "Soft type mouthpiece with water releasing and water stopping functions" of U.S. Pat. No. 6,085,947 is a soft type mouthpiece, comprising: a soft type mouthpiece having a water outlet at a front end, and a toothed tube portion at a rear end; a positioning seat having a toothed tube portion internally provided with an internal channel of a smaller diameter at one end, and a sectioned portion of a larger diameter, said sectioned portion having an inner wall provided with a leakage-proof flange and a depressed groove, said rear end of said mouthpiece being insertably secured on said toothed tube of said positioning seat; and a slidable sleeve having a ratchet tooth tube at one end, and an annular tube at the other end that can insert into said sectioned portion of said positioning seat, said annular tube having an annular wall provided with a positioning flange, a suitably indented slide groove at a rear end of said positioning flange, and an urging post at the center of a front end of said annular tube, the periphery of said urging post being hollowed out to form water slots; whereby said slidable sleeve is inserted into said sectioned portion of said positioning seat such that said urging post closes a gate, with said leakage-proof flange of said positioning seat retained in said slide groove of said slidable sleeve, said positioning flange of said slidable sleeve being retained in said depressed groove of said positioning seat as well, thereby changing the relative position of said positioning seat and said slidable sleeve to achieve water release or water stopping.

Although the aforementioned "Soft type mouthpiece with water releasing and water stopping functions" can improve the prior-art "Mouthpiece structure of sports water bag ", its operation still requires the user to suck or bite the soft sucking head since the sucking head is a soft type mouthpiece. Therefore, it requires a larger force from the user to bite the mouthpiece for the use, and the above prior-art structure still needs to be improved.

SUMMARY OF THE INVENTION

The primary objective of the present invention is to provide an easy-to-use water outlet valve for the users to drink water from the water bag and secure the mouthpiece onto the water outlet valve.

To make it easier for our examiner to understand the objective of the invention, its structure, innovative features, and performance, we use a preferred embodiment together with the attached drawings for the detailed description of the invention.

The foregoing object and summary provide only a brief introduction to the present invention. To filly appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
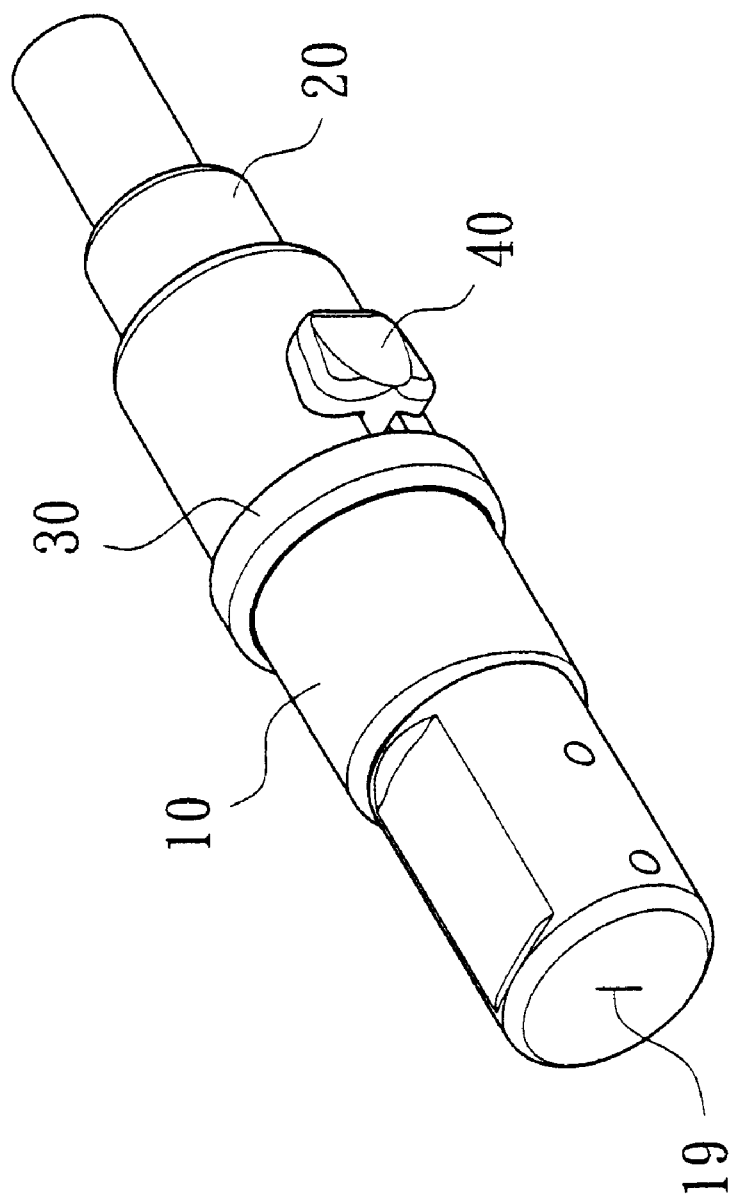
FIG. 1 is a perspective view of the water outlet valve according to the present invention.
Figure 2:
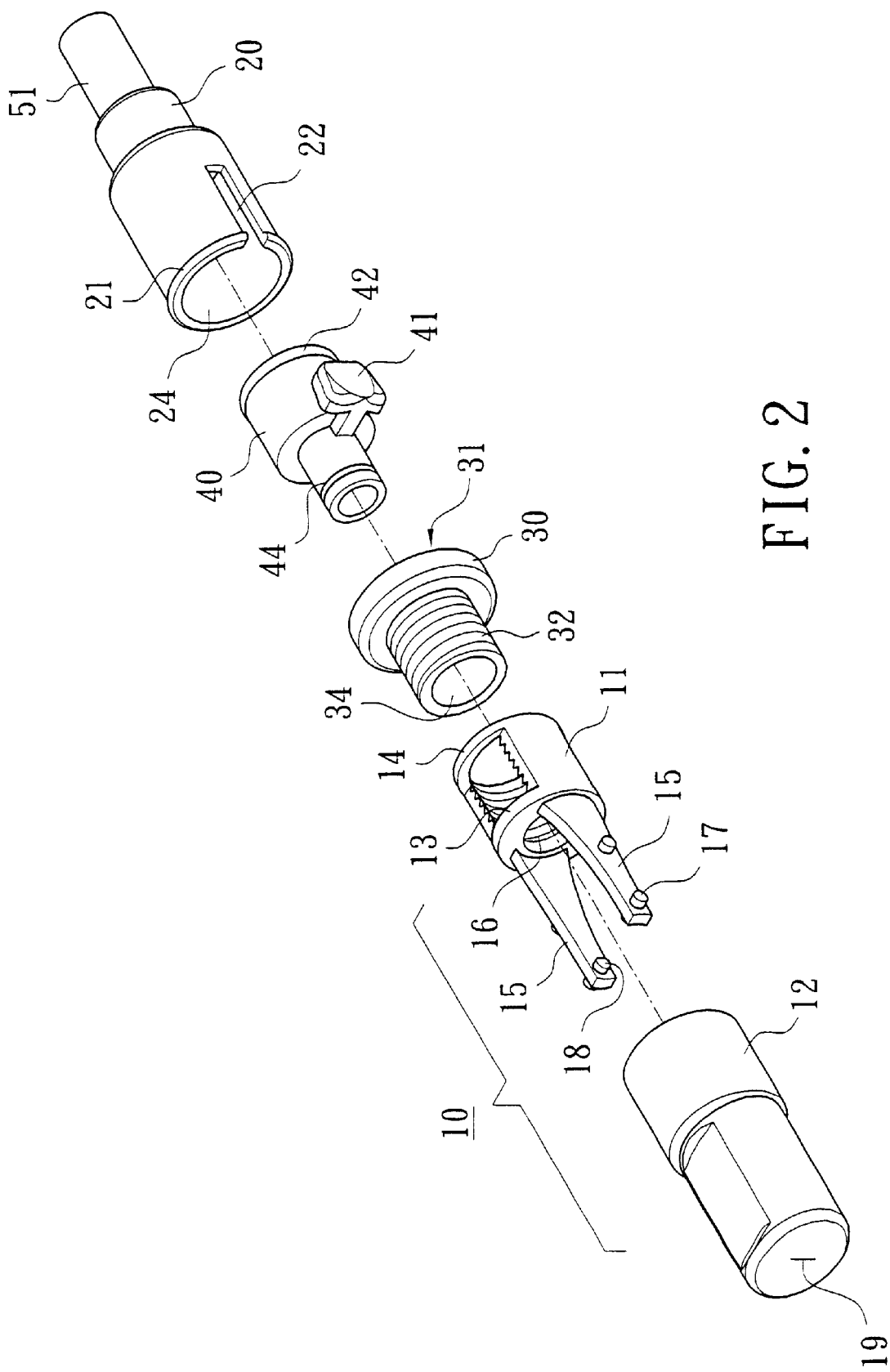
FIG. 2 is a perspective exploded view of the water outlet valve according to the present invention.
Figure 3:
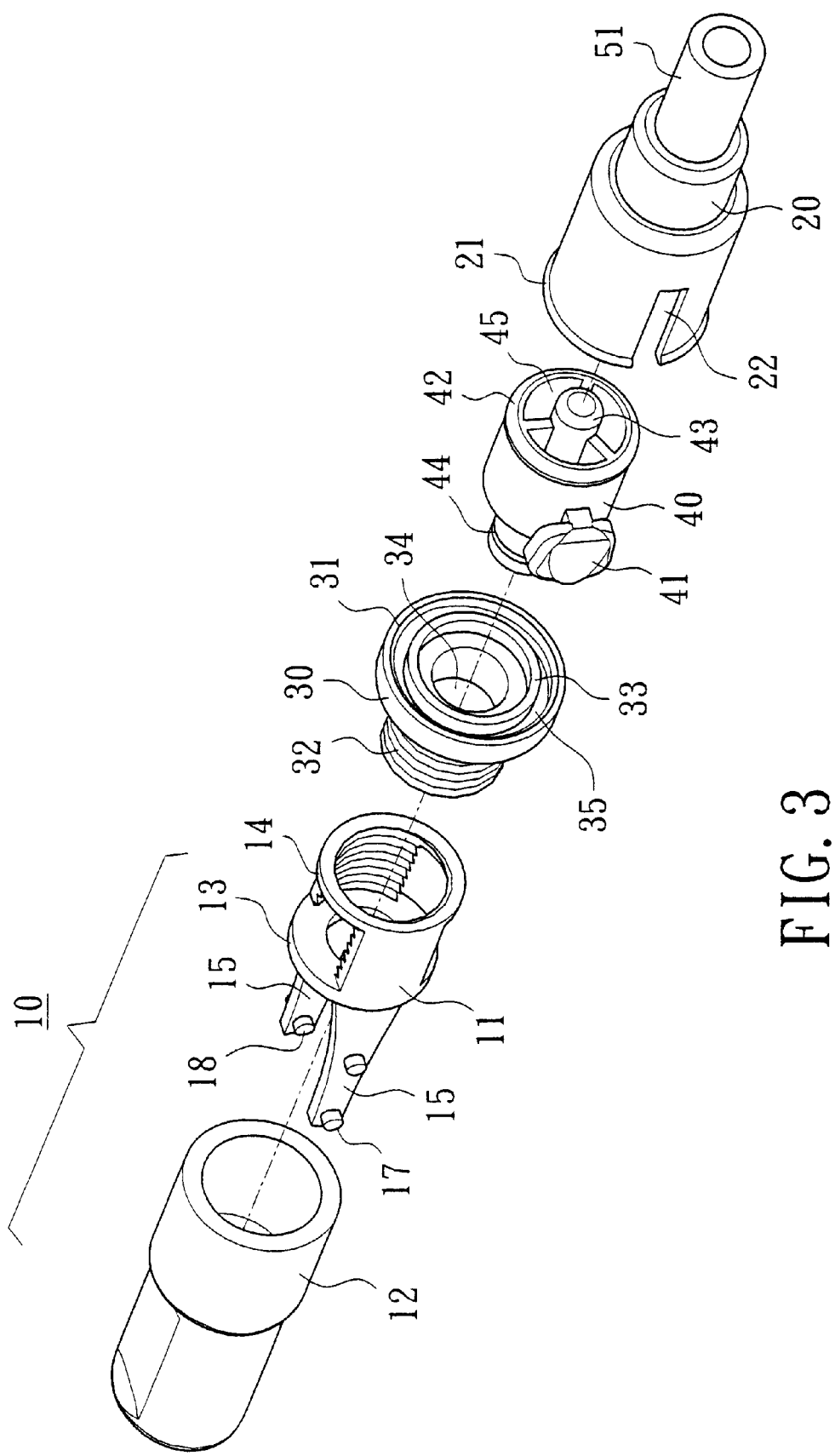
FIG. 3 is another perspective exploded view of the water outlet valve according to the present invention.
Figure 4:
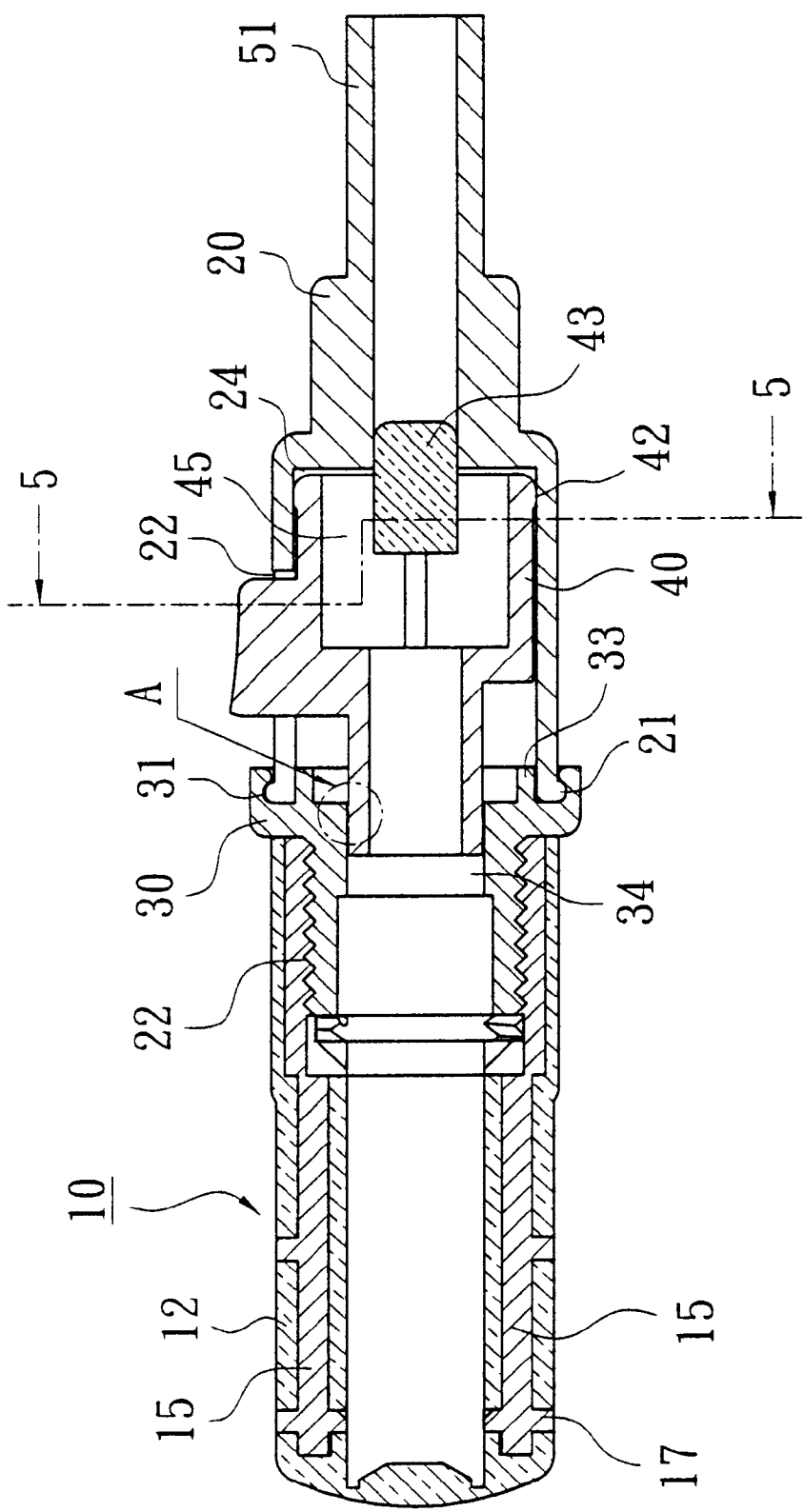
FIG. 4 is a cross-sectional view of the assembled water outlet valve according to the present invention.
Figure 5:
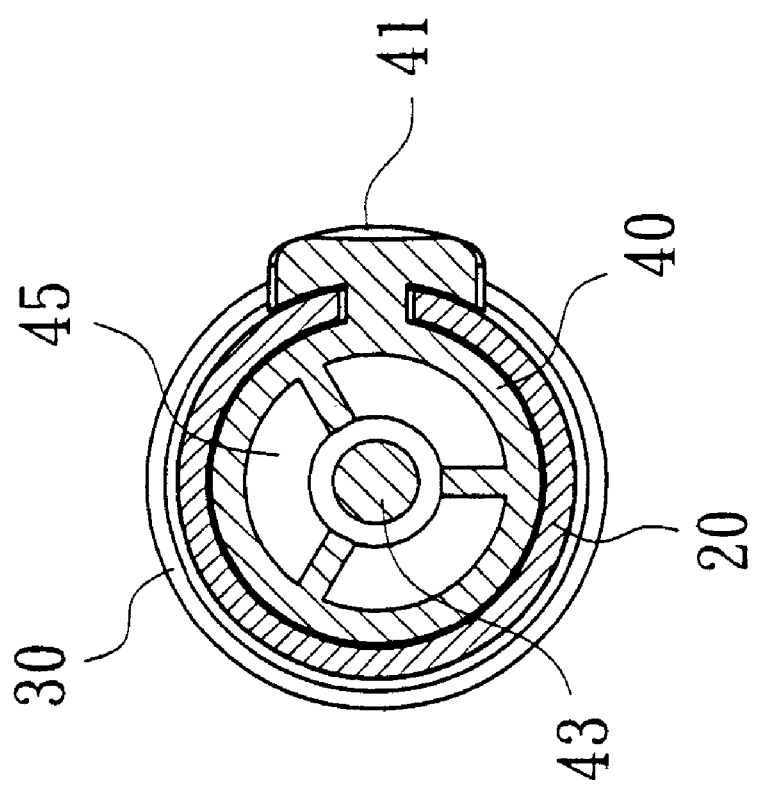
FIG. 5 is another cross-sectional view of the assembled water outlet valve according to the present invention.
Figure 6:
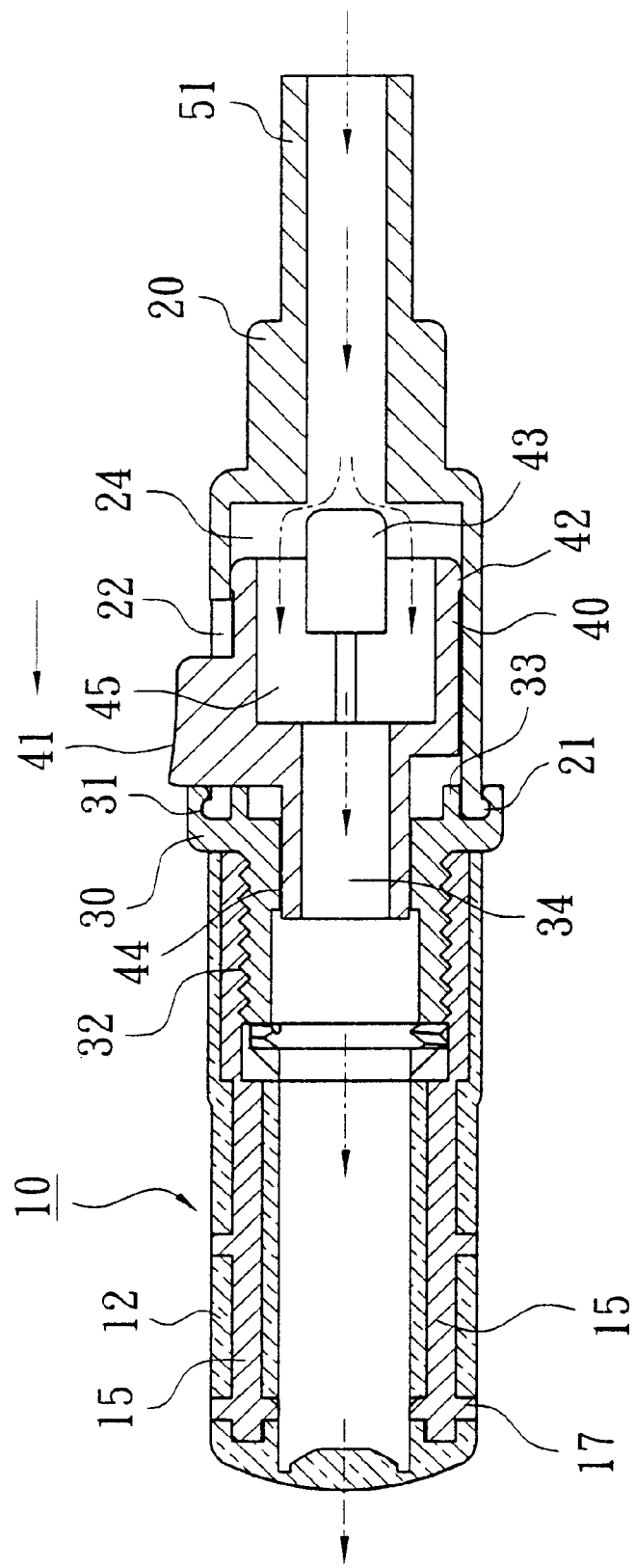
FIG. 6 is a cross-sectional view of the water outlet valve according to the present invention when it is in the water flowing state.
Figure 7:
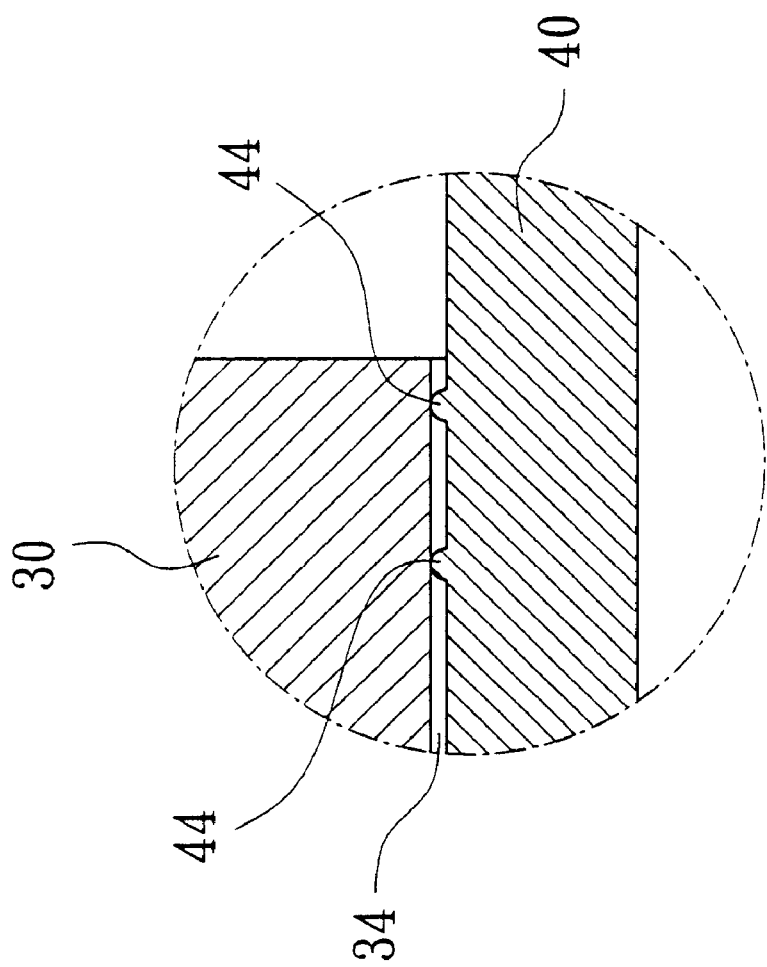
FIG. 7 is an enlarged schematic view of the water outlet valve shown in FIG. 4.
Figure 8:
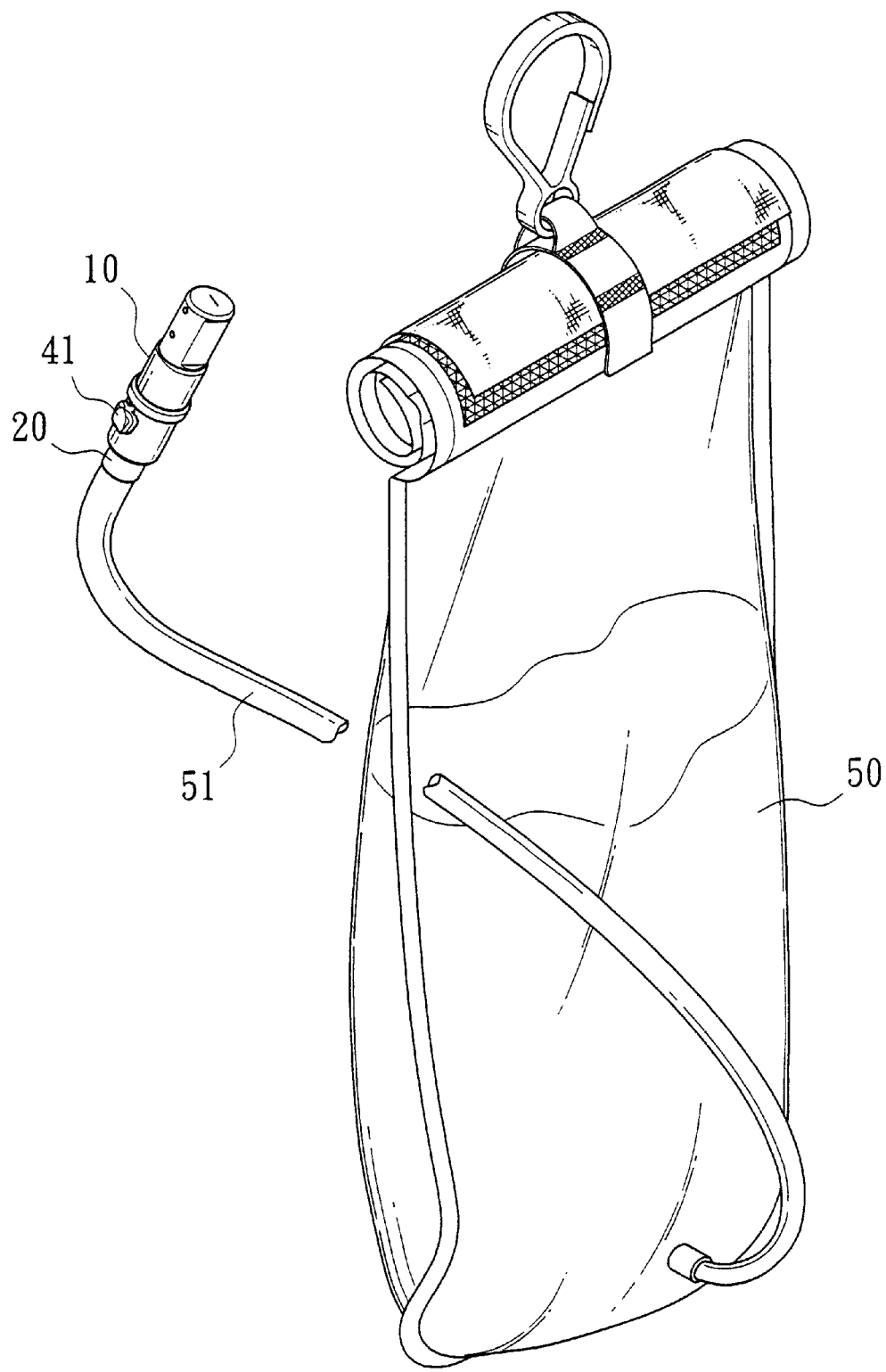
FIG. 8 is a schematic view illustrating the use of the water bag according to the present invention.

Please refer to the FIGS. 1 to 8 for the water outlet valve of a water bag mouthpiece according to the present invention, being comprised of a mouthpiece 10, a threaded base 30, a blocking member 40, and a connecting base 20; by means of the foregoing structure, a user can use the mouthpiece 10 to drink water in a water bag more easily, and also can fix the mouthpiece 10 more securely onto a guide tube 51 of a water bag 50 (as shown in FIG. 8)

Said mouthpiece 10 is composed of a sleeve cylinder 11, and a soft sucking section 12 wrapped around the exterior of the sleeve cylinder 11; said sleeve cylinder 11 comprises a through hole 16, and both ends of said sleeve cylinder 11 respectively have a fixed ring 13 and a threaded connecting ring 14; two stands 15 are extended from the end having the fixed ring 13 and proximate the through hole 16, and the two stands 115 are opened outward and far apart from each other, and the stands 115 respectively have a protruded member 17, 18 at both sides. The soft sucking section 12 at one side has a slit 19; the soft sucking section 12 is wrapped around the exterior of the sleeve cylinder 11 by plastic injection; the stand 15 at the mold post props the protruded member 18, such that when the protruded member 17 at the outer side is slightly opened, the protruded member 17 at the outer side presses against the inside of the mold. Further, plastic injection technology is applied to wrap the soft plastic material around the outside of the sleeve cylinder 11. When such process is completed, the mold post is withdrawn, so that the slit 19 has a closed end feature.

The threaded base 30 is disposed at one end of said mouthpiece 10, and said threaded base 30 comprises a circular latch groove 31 at the inner edge on one side; a threaded connecting section 32 is extended at the center from the other end of the threaded base 30, such that the threaded connecting section 32 is fixed into said sleeve cylinder 11; said threaded base 30 has a threaded connecting section corresponding to a penetrating hole 34 of said through hole 16. A wall 33 is disposed in said circular latch groove 31 proximate the inner edge of the central hole, and said wall 33 and said circular latch groove 31 define a groove 35.

Said blocking member 40 is disposed on one end of said threaded base 30, and has a push button 41 on a side thereof, and said blocking member 40 is hollow and has a hole 45 corresponding to said through hole 16 and said penetrating hole 34. A plug 43 is extended from one side of said blocking member 40 and at the middle of the hole 45. Both the front and rear ends of said blocking member 40 respectively have a rib ring 42, 44 to prevent water leakage from the penetrating hole 34 of the threaded base 30 (as shown in FIG. 7).

Said connecting base 20 is disposed at one end of said blocking member 40, and said connecting base at one end has a sleeve ring 21 coupled thereon and disposed in the groove 35 of said threaded base 30, such that the protruded flange of the sleeve ring 21 is latched into the circular latch groove 31. A guide tube 51 is integrally formed on another end of said connecting base 20 for connecting the water bag and guiding water. A cut groove 22 is disposed on one side of said connecting base; said cut groove 22 accommodates the protrusion of the push button 41 on the blocking member 40; a connecting hole 24 corresponding to said penetrating hole 16, through hole 34, and hole 45 is disposed on said connecting base 20; the plug 43 of said blocking member 40 is disposed in the connecting hole 24, so that the above structure constitute a novel water outlet valve of a water bag mouthpiece.

When the user uses the water bag, the user just needs to push the push button 41 on a side of the blocking member 40 forward along the cut groove 22 on a side of the connecting base 20, and thus separating the plug 43 at one end of said blocking member 40 from the water outlet of said connecting hole 24. At that time, the user only needs to gently bite the sucking section 12 of the mouthpiece 10, and then the stand 15 of the sleeve cylinder 50 will open the slit 19 for sucking the water in the water bag 50 along the guide tube 51 (as shown in FIG. 6). After the drinking is completed, the sucking section 12 is released, so that the elastic property of the two stands 15 resumes the slit 19 into a closed status. If the push button 41 is pushed back to its original position, then the blocking member 40 will shift and the plug of said blocking member returns to block the outlet of the connecting hole 24 and stops the water. Such arrangement can improve the shortcomings of the prior art, and allow users to use the mouthpiece 10 easily for releasing and stopping the water in the water bag 50, and fix the mouthpiece according to the present invention onto the guide tube 51 of the water bag 50 more securely, and thus attaining the purpose of its convenient use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A water outlet valve for a water bag mouthpiece comprising:

a waterpiece, being comprised of a sleeve cylinder and a soft sucking section wrapped around the exterior of said sleeve cylinder, said sleeve cylinder being a threaded one having a penetrating hole, and a fixed ring and a threaded connecting ring respectively disposed on both ends thereon;

a stand extended from one end of said fixed ring and proximate the penetrating hole, and said stand being slightly opened outward; a protruded member each being disposed on both sides of said stand, and a slit being disposed on one side of said soft sucking section;

a threaded base, disposed at one end of said mouthpiece, and said threaded base having a circular latch groove at one end, and a threaded connecting section extended from another end of the threaded base at the middle thereof for fixing said sleeve cylinder to said threaded connecting section, and said threaded base having a through hole, and a wall disposed at the inner edge of said circular latch groove proximate the center of said hole, and said wall and said circular latch groove defining a groove;

a blocking member, disposed at one end of said threaded base, having a push button at one side, a hole at its center, a plug extended from one side proximate the center of said hole, and a rib ring each disposed at a front end and a rear end of said blocking member;

a sleeve base, disposed on one end of said blocking member, and said sleeve base having a sleeve ring at one end to latch the wall of said threaded base and said circular latch groove to define a groove, and a guide tube being integrally formed and coupled to another end of said sleeve base for connecting the outlet tube of the water bag; a cut groove being disposed on one side of said sleeve base for accommodating said push button; a connecting hole being disposed on said sleeve base thereby accommodating the plug of said blocking member into said connecting hole; thereby a user just needs to push the blocking member to suck the sucking section for drinking water from the water bag, and just needs to push the blocking member back when not draining water from the water bag.

* * * * *